United States Patent [19]

Johnson et al.

[11] 4,231,160
[45] Nov. 4, 1980

[54] APPARATUS AND METHOD FOR MEASURING STATIC DEFLECTION OF RUNWAY SURFACE UNDER AIRCRAFT LOADING

[75] Inventors: Roger F. Johnson, Seattle; Allen M. Mitzel, Sumner, both of Wash.

[73] Assignee: The Boeing Company, Seattle, Wash.

[21] Appl. No.: 46,518

[22] Filed: Jun. 7, 1979

[51] Int. Cl.³ .............................................. G01B 11/30
[52] U.S. Cl. ...................................... 33/174 P; 33/286
[58] Field of Search ................. 33/174 R, 286, 174 P; 356/141, 152, 138

[56] References Cited

U.S. PATENT DOCUMENTS 3,603,688  9/1971  Smith-Varniz ......................... 33/286
3,970,391  7/1976  Johnson et al. ........................ 33/286

Primary Examiner—Willis Little
Attorney, Agent, or Firm—Conrad O. Gardner; B. A. Donahue

[57] ABSTRACT

A target comprising a displacement sensitive photodiode perpendicularly disposed with respect to the measuring axis perpendicular to the runway surface is provided above a runway surface under aircraft load. A laser beam is directed towards the diode and signal processing circuits coupled between the photodiode and display means during aircraft loading, and subsequent to aircraft load removal provide signals to the display means representative of displacement of runway surface.

4 Claims, 5 Drawing Figures

APPARATUS AND METHOD FOR MEASURING STATIC DEFLECTION OF RUNWAY SURFACE UNDER AIRCRAFT LOADING

This invention relates to apparatus and methods for measuring the amount of static deflection on a designated point of a loaded runway and more particularly to means including a laser beam for determining the amounts of static deflection.

Numerous prior attempts at measuring surface flatness and roughness have been made. Also, U.S. Pat. No. 3,885,875 disclosed a noncontact surface profilometer incorporating sum and difference circuitry driven by outputs from semicircular photocells.

Also, heretofore, as seen in FIG. 1 herein labeled prior art, a ten foot steel bar with a dial indicator was used with problems which were twofold. First, the bar was heavy and unwieldy. Second, measurement A is not the actual displacement of the surface. In general, even for a nose landing gear, the depressed area can extend twenty feet or more from the loaded point. A is always less than B. In use comparing the system labeled prior art of FIG. 1 and the system according to a hereinafter described embodiment of the present invention, the discrepancy can be off as much as a factor of 2. That is, if B were 0.120 inches, the measurement at A would only be 0.060 inches. This tends to make aircraft runways appear stronger and stiffer than in actuality.

It is accordingly an object of the present invention to provide means for measuring the amount of static deflection on a designated point of a loaded runway.

It is yet another object of the present invention to provide a system including source and detector for determining actual displacement of runway wherein the source can be positioned on a solid surface remote from a relatively spongy runway, thereby isolating the reference plane from the measured point.

It is yet a further object of this invention to provide signal processing circuit means including a difference amplifier and analog divider coupled to a displacement sensitive linear photodiode for cancelling variations in received output due to impinging laser beam intensity fluctuations.

Further objects and features of the present invention will become apparent in the course of a reading of the following specification and drawings wherein.

Figure 1:
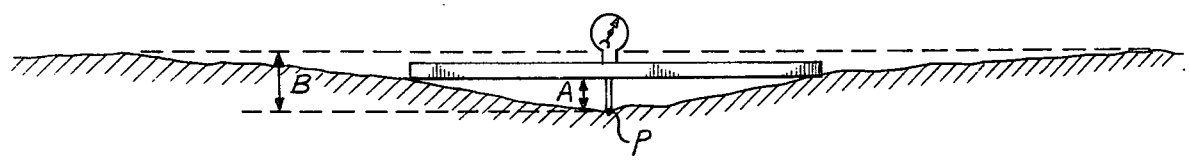
FIG. 1 is a side view partly schamatic of prior art steel bar and dial indicator for measuring runway deflection.
Figure 2:
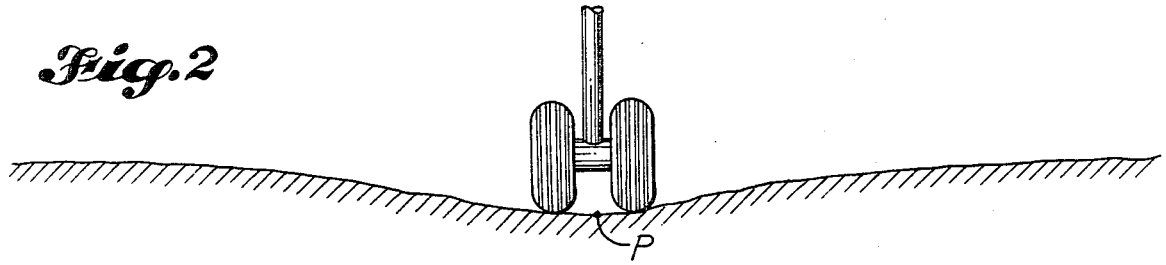
FIG. 2 is a front view of aircraft landing gear loading the runway surface at measured point P.
Figure 3:
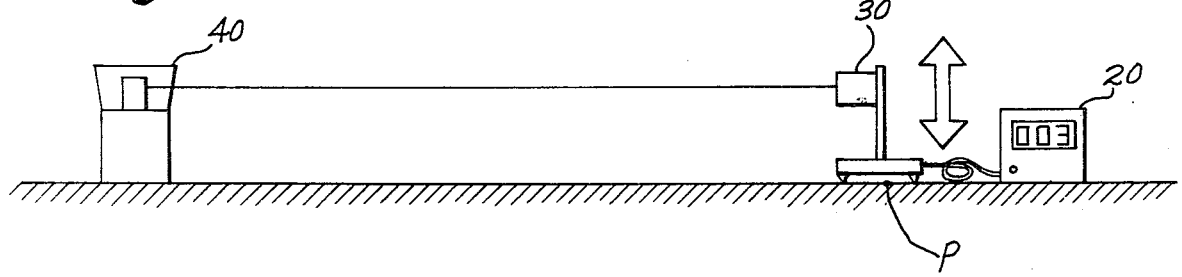
FIG. 3 is a simplified side view illustrative of the manner of deployment of apparatus of a present system embodiment.

Turning now to FIG. 1, it will be observed that an exemplary prior art device for measuring the amount of static deflection comprises the steel bar and dial indicator positioned at the measuring axis which passes through the point P. As noted earlier, the measuring axis through measuring point P yields a measurement A which is not the actual displacement B of the surface. In contrast, the present measurements can be taken at a point B near the loaded area as seen in FIG. 2 to provide in a manner hereinafter described the actual displacement B. FIG. 3 is believed helpful in showing how the source laser beam generator 40 can be remotely positioned (hundreds of feet away if desired) from detector 30 which is disposed at the measuring axis passing through measuring point P. After the aircraft is rolled away and the runway returns to its original position, display 20 reflects the actual displacement.

System accuracy to a large extent is dependent upon the fact that the source laser beam generator is placed on a solid surface or reference plane isolated from the runway surface load area so that relative motion of the runway surface is measured with respect to a standard but fixed reference point in the plane of the runway surface. The laser generator is arranged electronically to project a level beam of light.

Figure 4:
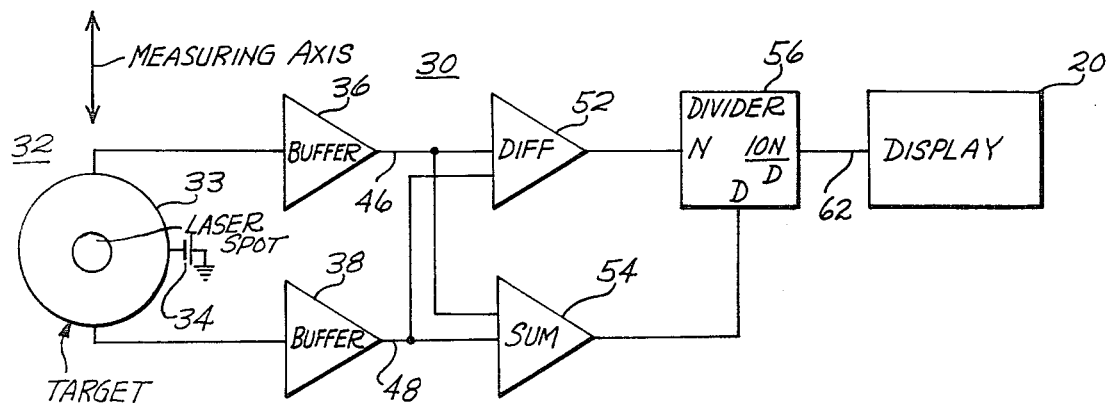
FIG. 4 is a block diagram of the present laser beam receiver including target detector shown coupled to a display device; and, FIG. 5 is a detailed circuit schematic of the laser beam receiver shown in block diagram form in FIG. 4.
Figure 5:
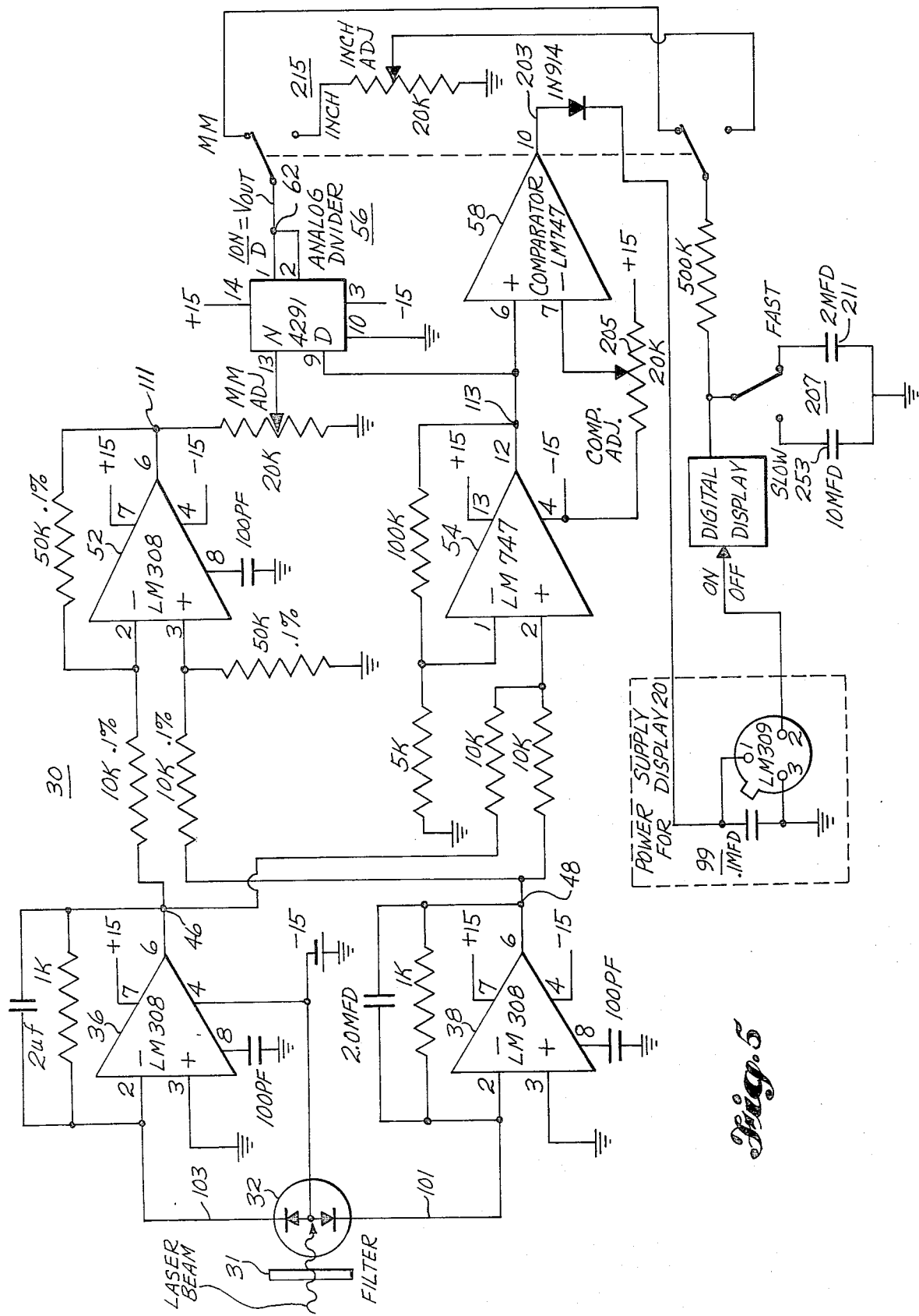

Turning now to the laser beam receiver block diagram of FIG. 4, it can be seen that when the level laser beam from laser beam generator 40 of FIG. 3 is directed toward detector circuit 30 target 32 comprising linear diode 33 and bias potential 34, first and second photocurrents are provided respectively to buffer amplifiers 36 and 38. If the laser beam is targeted on the geometric center of linear diode 33 then the output voltages 46 and 48 are equal and the output from difference amplifier 52 is zero. Any displacements up or down from this null condition are reflected in the output of difference amplifier 52. The sum of output voltages 46 and 48 is also provided by summing amplifier 54. The difference signal becomes the numerator and the sum becomes the denominator input to analog divider circuit 56. The output signal 62 provides cancellation of any variations due to laser beam intensity fluctuations since a common term to both sum and difference signals thus being divided out. Displacement signal 62 drives a digital display providing measurement to the nearest thousandth of an inch which will be further appreciated from the description hereinafter made with regard to the detailed schematic circuit diagram of FIG. 5.

When a laser beam from laser beam generator 40 (e.g. a Model 944 Laser Level of Spectra Physics, Mountain View, Calif. as seen in the present system apparatus layout of FIG. 3 targets onto target 32 comprising a linear photodiode, e.g., a type PIN-SC/50 manufactured by the United Detector Technology Co. of Santa Monica, Calif.), the linear photodiode provides two output currents 101 and 103 while the center connection to minus fifteen volts bias provides an increased response speed. Generated photocurrents 101 and 103 are equal when the laser beam is exactly on the center of target 32 while one of these two currents increases in amplitude when the beam moves off the target center. These currents 101 and 103 have amplitudes which are proportional to beam intensity and displacement from the center of target 32. Buffer amplifiers 36 and 38 (type 308 op amps of National Semiconductor, Santa Clara, Calif.) are current to voltage buffers that provide voltage inputs to difference amplifier circuit 52 (type 308 op amp) and summing amplifier circuit 54 (a type 747 op amp). Difference amplifier circuit 52 provides an output voltage 111 that is proportional to beam intensity and displacement. Summing amplifier circuit 54 provides a unipolar output voltage 113 that is proportional to beam intensity and total power. These voltages can be written algebraically as follows:

Difference output voltage 111 = K (voltage 46 − voltage 48)

Sum output voltage 113=K (voltage 46+voltage 48)
Where K=proportionality constant due to light intensity Sum output voltage 113 and difference output voltage 111 are coupled to the inputs of analog divider circuit 56 (e.g. a type 4291K of Burr Brown Research Corp. of Tuscon, Ariz.). Output voltage 62 of analog divider circuit 56 denoted $V_o$ equals 10N/D where N is the numerator voltage, in this case difference output voltage 111 and D is the denominator voltage, voltage 113. Therefore output voltage $$62 = \frac{10K \text{ (voltage 46 − voltage 48)}}{K \text{ (voltage 46 + voltage 48)}}$$
$$= \frac{10 \text{ (voltage 46 − voltage 48)}}{\text{(voltage 46 + voltage 48)}}$$

From the preceding it can be observed that analog divider circuit 56 of laser detector circuit 30 cancels the K of the numerator and denominator above making output voltage 62 independent of laser beam intensity variations due to e.g. dust in the beam path or fluctuations in laser power supply voltages.

Turning now to comparator circuit 58, it will be observed that comparator circuit 58 output signal 203 is utilized to turn on and off analog display 20 (via power supply 99 which is a 5 volt regulator supply LM309 for digital display 20 panel meter) depending on the presence or absence of sufficient laser beam intensity level upon photodiode target 32. The input voltage 113 hereinbefore discussed is coupled to an input terminal of comparator circuit 58 and is derived from summing amplifier circuit 54 which is a measure of the sum of the two input currents which is, to a constant of proportionality a measure of incident laser beam power. The threshold is adjusted by varying comparator adjust potentiometer 205. Output voltage 62 is coupled through a digital display calibrate circuit 215 which is adjustable by potentiometer means to provide (through precision micrometer verification) digital display 20 (which may comprise a Datel Systems, Inc. of Canton, Mass., Model DM-3100U) readings directly in thousandths of an inch or hundredths of a millimeter. Digital display 20 includes a measuring speed control circuit 207 connected in series circuit path to reference potential between digital display calibrate circuit 215 and digital display 20. Measuring speed control circuit 207 comprises fast or slow measuring speed switch 209 (S.P.D.T.) which may be coupled through lower (2 MFD) value capacitor 211 or higher value capacitor 213 (10 MFD) respectively to reference potential. Slow speed (large time constant for digital display 20) position of switch 209 is selected on windy days or days of excess heat wave dissipation from the runway surface when the index of refraction is changing rapidly and shifting the laser beam around on its path to target 32 while the fast position is selected under normal conditions of digital display 20 damping constant (small capacitance) requirements when quick shift in digital display readings are not occurring. In the slow position approximately 15 seconds are required upon a movement of point P (see FIG. 2) of 0.025 inches for an actual reading of 0.025 inches on digital display 20.

After direction of a laser beam to target 32 and obtaining a null reading on digital display 20 and the aircraft is moved from point P, a digital readout of runway deflection is obtained.

An interference filter 31 (Corion Corp., Holliston, Mass. 01746, Filter #100-6328-2) that admits only helium-neon laser radiation onto the photodiode surface allows the measuring system to be blind to outside light sources. Filter 31 has a peak in its transmission versus wavelengths curve of 6328 Angstroms with a bandwidth of 100 Angstoms. The filter 31 is placed 0.1″ from the photodiode surface. This enables the operator to use the helium-neon laser generator and display system night or day and under any lighting condition.

We claim:

1. In an aircraft runway surface deflection measuring system including a reference potential, a detector circuit and a display device, said detector circuit coupled to said display device, said detector circuit comprising:
    photodiode target means responsive to a reference beam of light for providing first and second output currents;
    sum and difference amplifier circuits responsive to said first and second output currents for providing sum and difference signals;
    analog divider circuit means responsive to said sum and difference signals for providing an output voltage;
    circuit means for calibrating said display device;
    said circuit means coupled between said analog divider circuit means and said display device; and,
    measuring speed control circuit means for providing fast or slow measuring speeds, said measuring speed control circuit means connected between said circuit means and said display device, and said reference potential.

2. The invention according to claim 1 further including an optical interference filter disposed adjacent said photodiode target means.

3. The invention according to claim 1 wherein said measuring speed control circuit means comprises switching means coupled to first or second capacitors for providing first or second damping constants for said display device respectively dependent upon corresponding first or second speeds of readout desired.

4. Method of measuring runway surface deflection comprising the steps of:
    maneuvering an aircraft over a point P on a runway surface;
    positioning a receiver adjacent a point P representative of said runway surface point deflected by the load of said aircraft;
    directing a laser beam towards said receiver;
    adjusting said receiver output to provide a null reading;
    maneuvering said aircraft away from said point P on said runway surface; then,
    obtaining a readout of said receiver representative of the actual displacement of said point P caused by aircraft loading.

\* \* \* \* \*